US007040161B2

(12) United States Patent
Publl et al.

(10) Patent No.: US 7,040,161 B2
(45) Date of Patent: May 9, 2006

(54) PARTS WASHER WITH IMPROVED TEMPERATURE AND PUMP CONTROL

(75) Inventors: Rudy Publ, Glendale Heights, IL (US); Brian Porter, Brookfield, IL (US); Michael Korkowski, Antioch, IL (US); Don Knill, Lindenhurst, IL (US)

(73) Assignee: Safety-Kleen Systems, Inc., Plano, TX (US)

( * ) Notice: Subject to any disclaimer, the term of this patent is extended or adjusted under 35 U.S.C. 154(b) by 0 days.

(21) Appl. No.: 11/045,699

(22) Filed: Jan. 28, 2005

(65) Prior Publication Data

US 2005/0126592 A1 Jun. 16, 2005

Related U.S. Application Data

(62) Division of application No. 10/412,068, filed on Apr. 10, 2003, now Pat. No. 6,874,512.

(51) Int. Cl.
*G01F 23/24* (2006.01)

(52) U.S. Cl. .......................................................... 73/295

(58) Field of Classification Search ................ 374/141, 374/142; 340/622; 134/111, 113; 73/291, 73/295

See application file for complete search history.

(56) References Cited

U.S. PATENT DOCUMENTS

| | | | | |
|---|---|---|---|---|
| 3,522,814 | A | | 8/1970 | Olson et al. |
| 4,170,240 | A | | 10/1979 | Gentry |
| 4,284,878 | A | * | 8/1981 | Bartels ....................... 392/403 |
| 4,315,143 | A | | 2/1982 | Willinger et al. |
| 4,379,220 | A | | 4/1983 | Middleman et al. |
| 4,457,805 | A | | 7/1984 | Pastor |
| 4,462,415 | A | | 7/1984 | Otzen |
| 4,583,401 | A | * | 4/1986 | Schlindwein et al. ......... 73/295 |
| 4,617,456 | A | | 10/1986 | Richards et al. |
| 4,676,261 | A | | 6/1987 | Blaul |
| 4,741,259 | A | | 5/1988 | Ogata et al. |
| 4,774,006 | A | * | 9/1988 | Kaufmann .................. 210/742 |
| 4,929,930 | A | * | 5/1990 | Rezabek ..................... 340/622 |
| 5,303,725 | A | | 4/1994 | Hilgren |
| 5,437,002 | A | | 7/1995 | Bennett |
| 5,464,033 | A | | 11/1995 | Hartnell |
| 5,529,080 | A | | 6/1996 | Minkin |
| 5,598,861 | A | | 2/1997 | Danowski et al. |
| 6,019,110 | A | | 2/2000 | McClure et al. |
| 6,044,854 | A | | 4/2000 | Marks |
| 6,074,491 | A | | 6/2000 | McClure et al. |
| 6,128,438 | A | | 10/2000 | Kim |
| 6,279,587 | B1 | | 8/2001 | Yamamoto |
| 2001/0035827 | A1 | * | 11/2001 | Snelling ..................... 340/622 |
| 2002/0074019 | A1 | | 6/2002 | McClure et al. |

* cited by examiner

*Primary Examiner*—Hezron Williams
*Assistant Examiner*—Paul M. West
(74) *Attorney, Agent, or Firm*—Vedder Price Kaufman & Kammholz

(57) ABSTRACT

A parts washer including a receptacle positioned on a reservoir for cleaning liquid having a drain opening and a module which engages a portion of the reservoir in the cleaning liquid for adjusting the temperature of the cleaning liquid and circulating the cleaning liquid into the receptacle. The module includes a heating element, a sensor and pump. An enclosure houses a temperature controller which displays the temperature of the cleaning liquid and a low liquid level condition. A bridge thermally links the heating element to the sensor so that the sensor normally generates a signal representative of the temperature of the cleaning fluid unless the level of the cleaning fluid is disposed below the sensor.

5 Claims, 9 Drawing Sheets

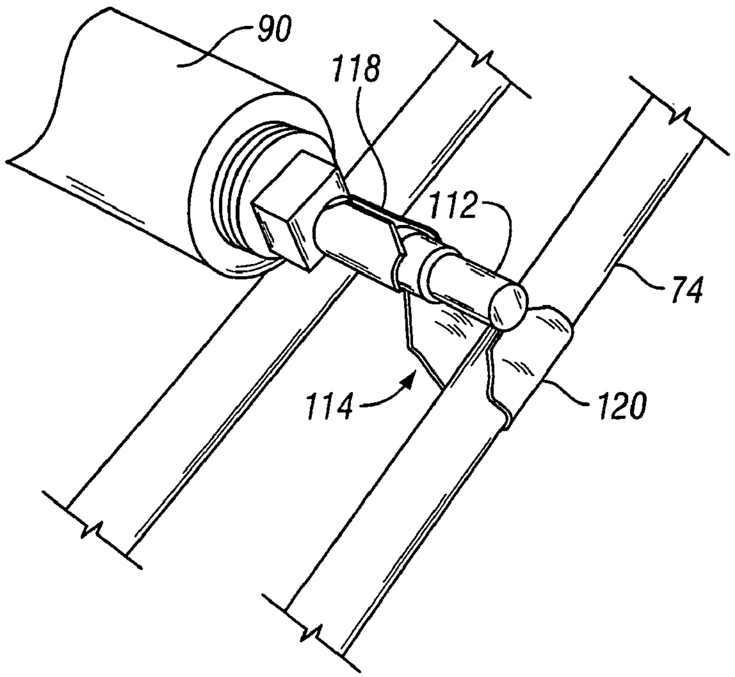
FIG. 5A1
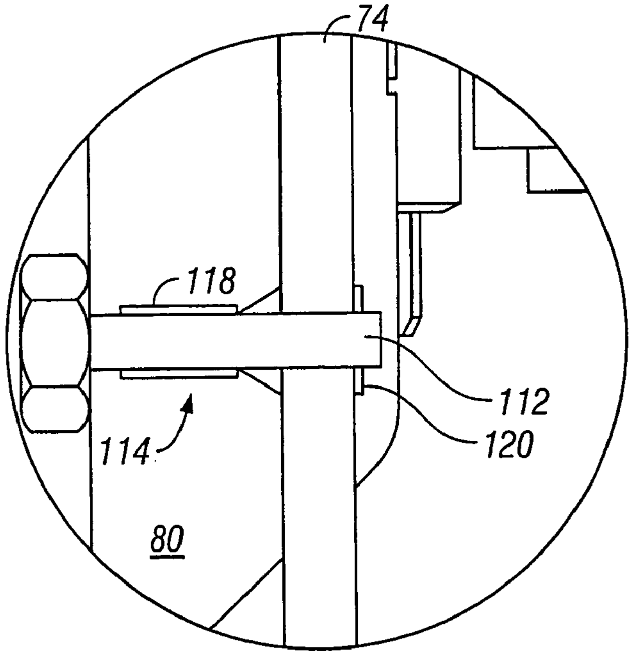
FIG. 5A2

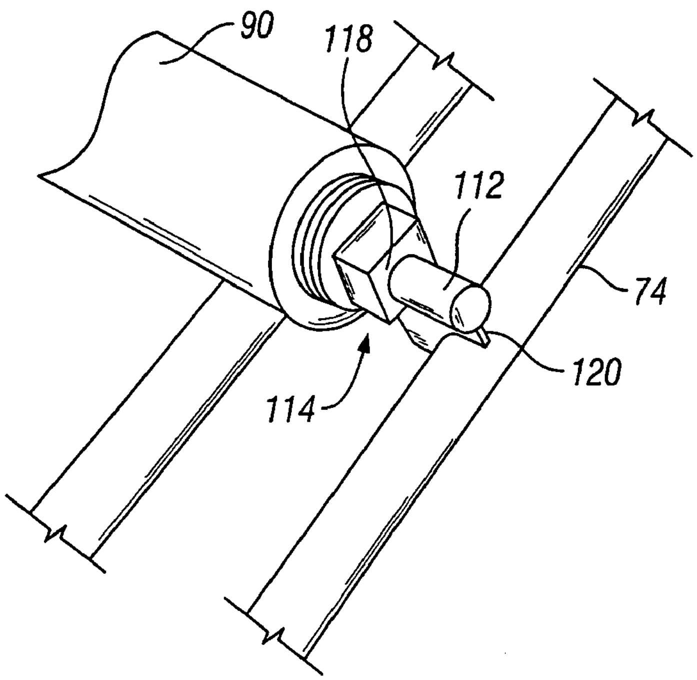
FIG. 5B1
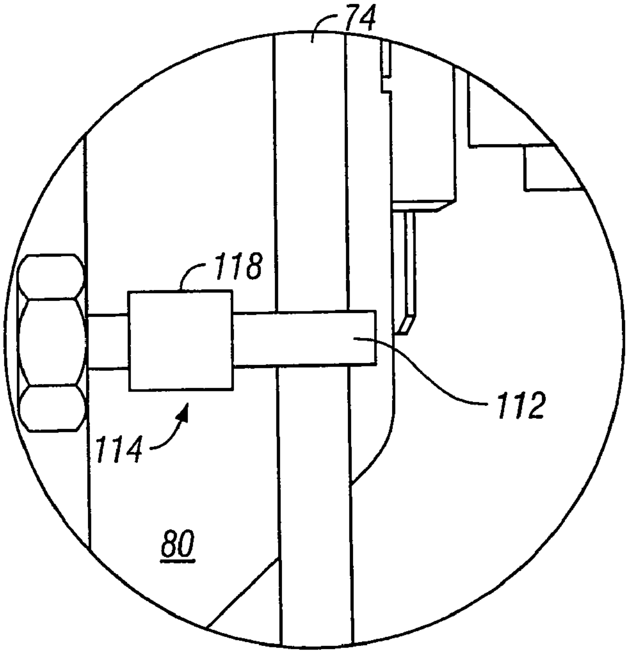
FIG. 5B2

PARTS WASHER WITH IMPROVED TEMPERATURE AND PUMP CONTROL

CROSS-REFERENCE TO RELATED APPLICATION

This application is a divisional of application Ser. No. 10/412,068, filed Apr. 10, 2003, now U.S Pat. No. 6,874,512, entitled "PARTS WASHER WITH IMPROVED TEMPERATURE & PUMP CONTROL".

BACKGROUND OF THE INVENTION

The present invention relates generally to an apparatus for controlling the temperature and flow of liquids, and in one instance, controlling cleaning liquid flow in a manual or soak parts washer apparatus of the type having a cleaning liquid reservoir, a receptacle, such as a sink, associated with the reservoir for positioning parts to be washed by cleaning liquid contained in the reservoir, a heating element for adjusting the temperature of the cleaning liquid and a pump and motor for recirculating the cleaning liquid from the reservoir to the sink.

Typical parts washers with which the invention is useful are parts washers of the type described in U.S. Pat. Nos. 3,522,814; 4,049,551; 4,261,378; 5,598,861 and 5,720,308, each of which is incorporated by reference in their entireties herein. These patents generally describe parts washers wherein a sink is positioned atop a barrel-type reservoir and in which a submersible pump in the reservoir circulates cleaning liquid from the reservoir to the interior of a sink in which parts are disposed for washing. While the washing is being carried out, cleaning liquid continually drains from an opening in the bottom of the sink back into the reservoir sometimes passing through a filter or screen on its way to the reservoir.

Over the years, the most successful parts washers have been those that can be readily and economically serviced. Servicing has consisted of changing the cleaning liquid, the filter, if any, and a general machine clean-up. In use, cleaning liquid used in a parts washer becomes increasingly dirty until its ability to clean is compromised by the presence of dispersed contaminants and/or soluble oils and greases. Service may also include replacing the entire heater/pump module as a result of operational failure.

The present invention involves the discovery that earlier parts washers, however successful, have several disadvantages. First, the parts washers are not field serviceable. If one component of the temperature and/or pump control assembly fails, the entire unit must be replaced. For example, the pump is the source of a majority of problems related to operability. The pump housings are usually plastic and commonly attached to a distal end of a conduit used to route power control wires for the pump motor. A metallic fitting interfaces the conduit to the pump housing. Cracks develop in the pump housing at the interface as a result of pump vibrations because the pump is not additionally supported. As a result of this disadvantage, the pump often fails and the entire unit must be replaced. Consequently, costs to the vendor and ultimately the customer are constantly increased.

Another disadvantage of earlier parts washers is that there is no ability to interactively troubleshoot or diagnose problems with respect to the operative condition of the parts washers. In this respect, there was no diagnostic readout. Manual piece-by-piece diagnosis was necessary in order to determine the reason for inoperability. In some earlier parts washers, a low liquid level shut-off is provided. However, such output has limited usefulness. As a result, field service personnel must replace the entire unit if it is inoperable. Again, costs continue to increase.

Yet another disadvantage of earlier parts washers is that there is no adjustable temperature controller for use with various different cleaning liquid requirements. Conventional temperature controls are usually simplistic bi-metallic switches which are subject to short to ground failure in the event the electrical control wire conduit is breached and cleaning liquid becomes disposed therein. Further, these switches are pre-set from the manufacturer for a specific temperature set-point which cannot be adjusted. A different switch, hence a different unit, may be required for various different cleaning liquids. Moreover, the control accuracy of the switches is very low, normally on the order of plus or minus 5–15 degree temperature variance from the set-point permitted. As a result, costs to the vendor and customer are increased and the customer experiences inaccurate temperature control and cleaning liquid performance.

Still another disadvantage of the earlier parts washers is that they are large, unwieldy and generally very difficult to handle. There is no structure provided for properly lifting the heater/pump module. As a result, the units are mishandled and easily damaged during routine servicing.

A further disadvantage of earlier parts washers is that there is no over-current protection for the unit. This is especially detrimental to the long-term operation of the unit when operators do not pre-qualify electrical service outlets to which the units are connected.

Therefore, there is a need for a parts washer having an improved temperature and pump control that is modular in design to facilitate field reparability, provides the ability for diagnosis and trouble-shooting, includes an adjustable and programmable temperature controller, is made of durable materials and provides an information readout.

BRIEF DESCRIPTION OF THE DRAWINGS

The invention may be best understood by reference to the following description taken in conjunction with the accompanying drawings, in the several figures of which like reference numerals identify like elements:

FIGS. 5A1 and 5B1 are detailed perspective views of the sensor assembly of the module of FIGS. 3 and 4;

FIGS. 5A2 and 5B2 are detailed top or front views of the sensor assembly of FIGS. 5A1 and 5A2, respectively;

DETAILED DESCRIPTION OF A PREFERRED EMBODIMENT OF THE INVENTION

Figure 1:
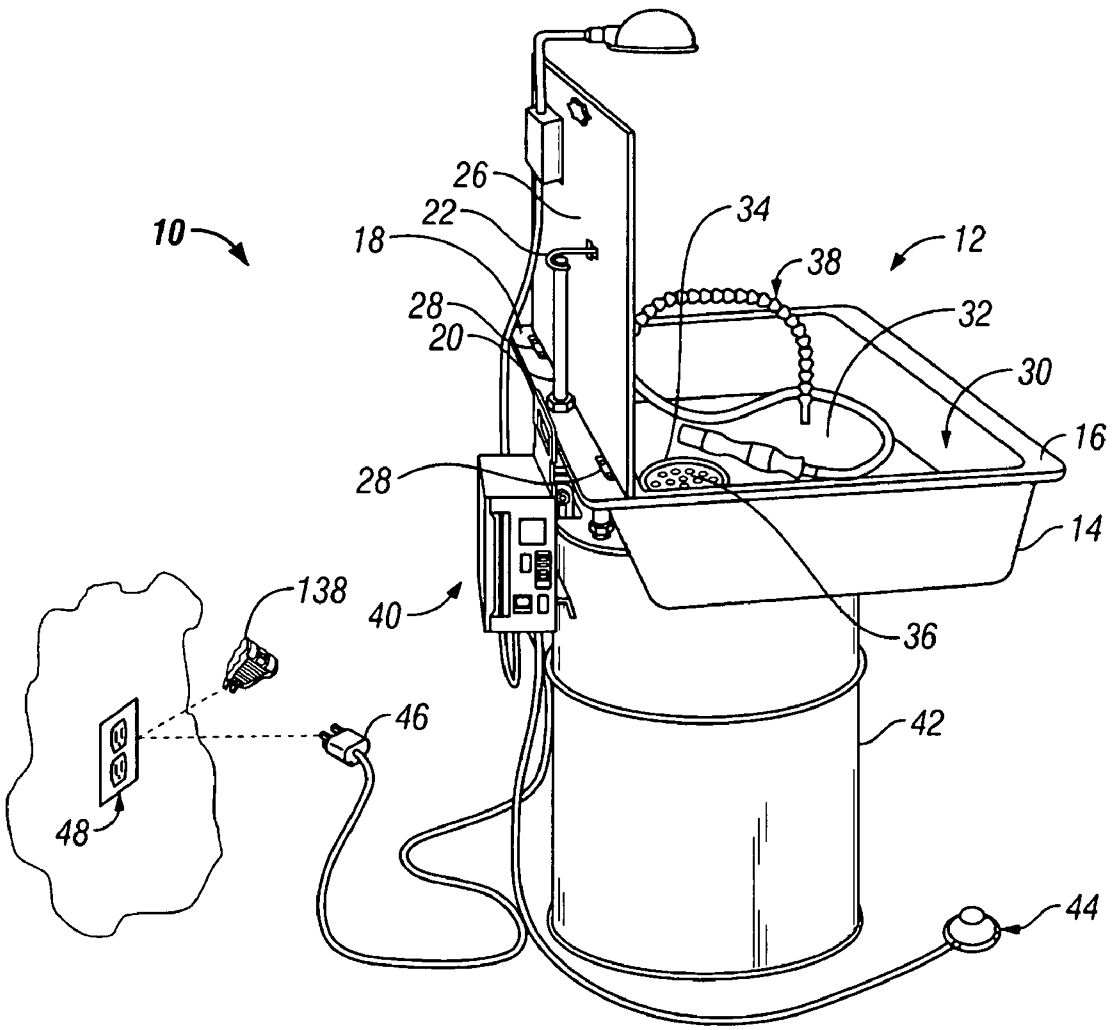
FIG. 1 is a perspective view of the improved parts washer constructed in accordance with the principals of the present invention.

The parts washer including an improved temperature and pump control of the present invention is primarily for use in connection with parts washing operations in commercial and industrial applications. A parts washer for washing mechanical parts may include, in combination, a parts receiving receptacle positionable on a reservoir for cleaning liquid, a drain opening formed in a part of the receptacle and a module engageable with a portion of the reservoir and the cleaning liquid for adjusting a temperature of the cleaning liquid and circulating the cleaning liquid into the parts receiving receptacle. The module further includes a heating element, a sensor assembly and a pump assembly including a pump and a motor for driving a pump. The heating element, sensor assembly and pump assembly are all connected to and supported by a bracket which extends and depends from an enclosure housing a programmable temperature controller for receiving sensor assembly signals and generating heater element signals. The sensor assembly is operatively coupled with the temperature controller such that the temperature controller may display the temperature of the cleaning liquid and a low liquid level condition. A bridge thermally links the heating element to a thermowell of the sensor assembly in which is disposed a thermocouple such that the sensor assembly normally generates a signal representing the temperature of the cleaning liquid unless of the cleaning liquid is disposed below the sensor assembly.

In one embodiment, the bridge is contiguous with the thermowell and the heating element. In another embodiment, the temperature controller includes a main control for maintaining the clean liquid temperature at a temperature set-point by receiving the sensory assembly signal, comparing the sensory assembly signal against the set-point, generating an activation signal if the sensor assembly signal is less than the set-point, and generating a deactivation signal if the sensor assembly is greater than the set-point. In such embodiment, the main control is operatively coupled with an interface control for generating a heating element signal responsive to the activation and deactivation signal for activating and deactivating the heating element. In yet another embodiment, the temperature controller is operatively coupled to the heating element and selectively activates the heating element to maintain the temperature of the cleaning liquid within a preselected range.

A module for adjusting a temperature of a cleaning liquid in a reservoir of a parts washer and for circulating the cleaning liquid from the reservoir to a surmounted parts receiving receptacle, where the module is removeably operatively associated with the reservoir and cleaning liquid, and further includes a heating element, a sensor assembly and a pump assembly. Each of the heating element, sensor assembly and pump assembly are connected to and supported by a bracket extending and depending from an enclosure. The enclosure includes a programmable temperature controller for receiving sensor assembly signals and generating heating element signals for periodically activating the heating element. The sensor assembly is operatively coupled to the temperature controller such that the temperature controller may display the temperature of the cleaning liquid and a low liquid level condition. A bridge thermally links the heating element to a thermowell of the sensor assembly in which is disposed a thermocouple such that the sensor assembly normally generates a signal representing the temperature of the cleaning liquid unless a level of the cleaning liquid is disposed below the sensor assembly. The temperature controller periodically deactivates the heating element in order to prevent over temperature of the cleaning liquid.

In one embodiment, the bridge is contiguous with the thermowell and the heating element. In another embodiment, the temperature controller includes a processing unit and memory that stores programming instructions, that, when read by the processing unit, caused the controller to function to: (i) receive a set-point for a desired cleaning liquid temperature; (ii) activate the heating element periodically; (iii) monitor the temperature of the cleaning liquid continuously; (iv) compare the monitored temperature of the cleaning liquid against the set-point; (v) alter the periodic activation of the heating element such that the temperature of the cleaning liquid is moved towards the set-point; and (vi) repeat steps (ii)–(v) for a desired period of time.

In such embodiment, further programming instructions, that, when read by the processing unit, causes the controller to function to: (i) generate an error code in response to an over temperature condition; and (ii) deactivate the heating element in order to correct the over temperature condition. In yet another embodiment, the set-point is defined as an operating range having an upper limit and a lower limit to which the temperature of the cleaning liquid is compared.

A method of operating a parts washer for washing mechanical parts including a parts receiving receptacle positionable on a reservoir for cleaning liquid, a drain opening formed in a part of the receptacle and a module for adjusting the temperature and circulation of the cleaning liquid, includes the steps of: qualifying an electrical service outlet to confirm proper wiring thereof; connecting the module to the qualified electrical service outlet; activating a main power switch on the module; inputting a desired temperature set-point to a temperature controller associated with the module; actuating a switch to activate a pump connected to the module for circulating the clean liquid from the reservoir into the receptacle; and cleaning parts. In one embodiment, the method further includes the steps of: observing an over temperature error code generally displayed by the temperature controller; resetting the temperature controller such that the temperature controller may run at the desired temperature set-point; observing whether the over temperature error code is repeated; and adding cleaning liquid if the over temperature error code is repeated. In another embodiment, the set-point is defined as an operating range having an upper limit and a lower limit.

A parts washer includes a receptacle positionable an a container forming a cleaning liquid reservoir, a drain opening in the receptacle and a module including a pump and a motor secured thereto. The pump includes an inlet and an outlet and a tube extending between the outlet and an interior portion of the receptacle. Activation of the motor turns the pump to pick up the cleaning and circulate the cleaning liquid through the tube to the interior portion of the parts receiving receptacle through the drain opening and into the reservoir. An improvement to such parts washer includes the module including a programmable temperature controller operatively connected to a sensor assembly in a heating element. A desired set-point may be inputted to the temperature controller such that periodic activation and deactivation of the heating element in cooperation with the sensor assembly results in the cleaning liquid disposed at a temperature within one degree Fahrenheit of the desired set-point. In one embodiment, the sensor assembly includes a bridge thermally linking a temperature sensor and the heating element. In another embodiment, a thermocouple of the sensor assembly is disposed within a thermowell and the thermowell is disposed closely proximate to the heating element.

A sensor assembly for detecting a temperature and low liquid level condition of a cleaning liquid includes a thermocouple operatively coupled to a temperature controller of the module which is disposed within the thermowell and adapted for emersion in the cleaning liquid and a bridge. The bridge is connected at a first end to the thermowell and a second end to a heating element such that the bridge conducts heat directly from the heating element to the thermowell and the thermocouple disposed therein when the cleaning liquid is in a low liquid level condition. The sensor assembly is particularly useful in connection with a parts washer positionable on a reservoir for the cleaning liquid including a drain opening formed in a part of the receptacle and a module. In one embodiment, the bridge is constructed from a thermally conductive material. In another embodiment, the first end of the bridge engages the thermowell without encircling and the second end of the bridge engages the heating element without encircling. In still another embodiment, the first end of the bridge encircles the thermowell and engages the thermowell with an interference fed in a second end is contiguous with the heating element.

A sensor assembly for detecting a temperature in a low liquid level condition of a cleaning liquid includes a thermocouple and a thermowell. The thermocouple is operatively coupled to a temperature controller of the module and is disposed within the thermowell which is adapted for emersion in the cleaning liquid. The thermowell is disposed closely proximate to the heating element such that when the cleaning liquid is in a low liquid level condition, the thermocouple detects a temperature of the heating element rather than a temperature of the cleaning liquid.

While the principles of the invention may be applied to different forms of parts washers, such as, but not limited to, manual and soak parts washers, the detailed descriptions set forth below pertain primarily to one general form of parts washer having a reservoir in the form of a cleaning liquid barrel, a parts receiving receptacle for the parts being washed in the form of a sink, and a removable module including a submersible pump assembly for recirculating the cleaning liquid, among other things. The cleaning liquid is preferably an aqueous solution, including but not limited to alkaline aqueous cleaner, or neutral pH aqueous cleaner, having an optimum operating temperature between 116° F. and 121° F. Any other aqueous cleaning liquids may also be used. Typical cleaning liquid use concentrations are usually within the range 3–25%. However, other concentrations may also be used in connection with the present invention from 0.001% to 100%.

Figure 2:
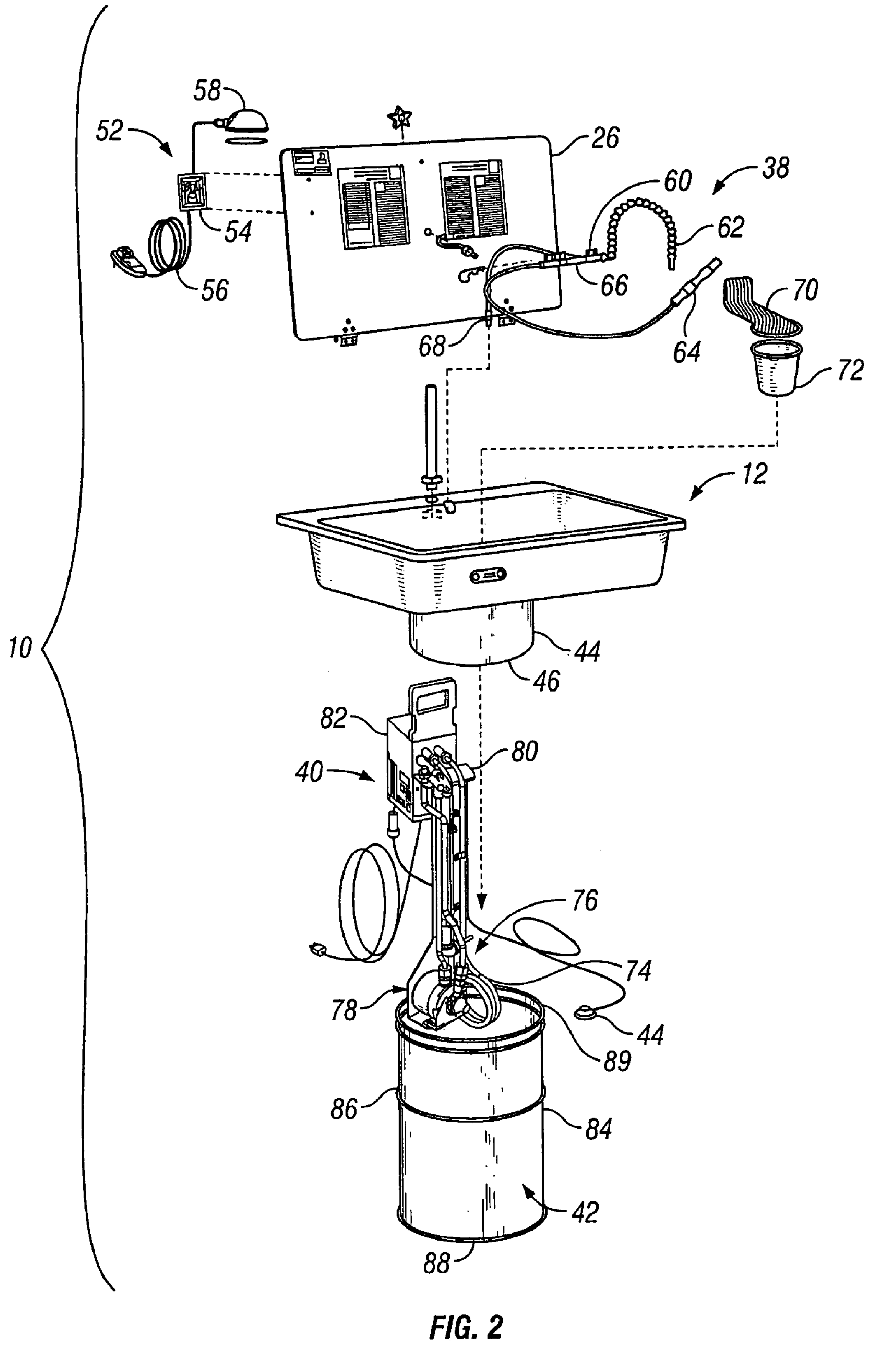
FIG. 2 is an exploded view of the parts washer of FIG. 1.

Referring now to the drawings in greater detail, FIG. 1 shows a form of parts washer generally designated 10 and shown to include a parts receiving receptacle in the form of a sink generally designated 12 for receiving mechanical parts or the like (not shown) to be washed by circulated cleaning liquid. The sink 12 includes plural, preferably tapered sidewalls 14, upper peripheral margins 16, and a rear margin 18 of increased width to which a stand 20 is affixed. The stand 20 positions a cover support 22 in the form of a rod. A cover 26 is mounted by a hinge 28 to the rear marginal flange 18 of the receptacle 12. The parts receiving receptacle or sink 12 unit includes a generally open interior area 30 defined in part by the sidewalls 14 and also by a bottom wall 32 that includes a tapered or beveled inner margin 34, the inner edges of which define a sink drain opening generally designated 36. A screen or filter “sock” may close off the drain opening 36, as best shown in FIG. 2. The parts receiving receptacle 12 further includes a nozzle/brush assembly 38 which facilitates circulation of the cleaning liquid into the parts receiving receptacle 12 for washing parts therewith.

The parts washer 10 is also shown to include a module 40 which is engageable with a portion of the reservoir 42 and the cleaning liquid for adjusting a temperature of the cleaning liquid and circulating the cleaning liquid into the parts receiving receptacle 12. A switch 44 is connected to the module 40 and is useful in controlling activation of a lamp and a pump as will be discussed in detail below. A plug 46 is connected to a distal end of an electrical cord and is adapted for engaging an electrical service outlet 48 in order to provide power to the module. A circuit tester 50 may be used in connection with a method of operating the parts washer 10 wherein the circuit tester 138 is used to qualify the electrical service outlet 48 to confirm proper wiring thereof as will be discussed in more detail below.

FIG. 2 is an exploded view of the parts washer 10 of FIG. 1. The parts receiving receptacle 12 further includes a generally cylindrical skirt 44 that includes lower margins 46 defining a generally circular central opening. A lamp assembly 52 is connected to the cover 26 by any conventional means. Preferably, a junction box 54 is adapted to receive one end of an electrical cord 56 and the conductors disposed therein for connection with the individual conductors of the lamp 58.

The nozzle/brush assembly 38 is connected to the parts receiving receptacle 12 by mounting tabs 60. The nozzle/brush assembly 38 includes a moveable nozzle 62, a flow-through brush 64, a supply conduit 66 and a feed line 68. The feed line 68 engages a fitting disposed on the module 40, as will be discussed below. Other suitable tools or implements useful for cleaning parts, such as, but not limited to, an air-powered cleaning brush may be used in place of or in addition to the nozzle/brush assembly.

The drain is operatively contiguous with a crumb catcher 70 and a filter sock 72. It will be recognized that the crumb catcher 70 and the filter sock 72 may be formed in any configuration. For example, the filter sock 72 is preferably made from an extremely lightweight, flexible and highly porous material. The module 40 includes a heating element 74, a sensor assembly 76 and a pump assembly 78, all of which are connected to and supported by a bracket 80 extending and depending from an enclosure 82. A small plate 104 (see also FIGS. 1, 3 and 4) extending chordwise between adjacent portions of the skirt 44 closes off a small portion of the reservoir opening, for purposes described elsewhere herein.

In the preferred form of apparatus shown in FIGS. 1 and 2, the entire parts washer 10 is removable as two separate units from an associated barrel generally designated 42 and shown to act as the reservoir for a mass of cleaning liquid (not shown).

As shown in FIG. 2 and elsewhere, the module 82 is positioned such that, when the parts washer 10 is in position of use, the pump assembly 78 will lie beneath the upper surface of the mass of cleaning liquid but above the bottom wall of the drum or barrel 42. It will be noted that the barrel 42 is of conventional construction, having cylindrical sidewalls 84 preferably containing at least one reinforcing rib 86, a bottom seam 88 at which the lower margin of the sidewalls 84 is joined to the outer margin of the bottom wall, and an upper seam 89 that supports the parts receiving receptacle 12.

Briefly, in assembling the parts washer 10 for use, the reservoir 42 is positioned in a desirable location. The cleaning liquid is then introduced into the reservoir 42 in a pre-specified amount. The module 40 is then positioned such that the heating element 74, sensor assembly 76 and pump assembly 78 engage the cleaning liquid in the reservoir. The bracket 80 is also partially submerged within the cleaning liquid. An upper portion of the bracket 80 engages the upper seam 89 such that the enclosure 82 is disposed on an exterior of the reservoir 42. An assembled parts receiving receptacle 12 may be then lowered into position over the reservoir. The nozzle/brush assembly is then connected to a pump output. The module may then be plugged into an electrical service outlet such that actuation of a power on/off switch (45, see FIG. 4) activates the module 40 including the heating element 74 and the switch 44 activates the pump assembly 78 and the lamp assembly 52.

Figure 3:
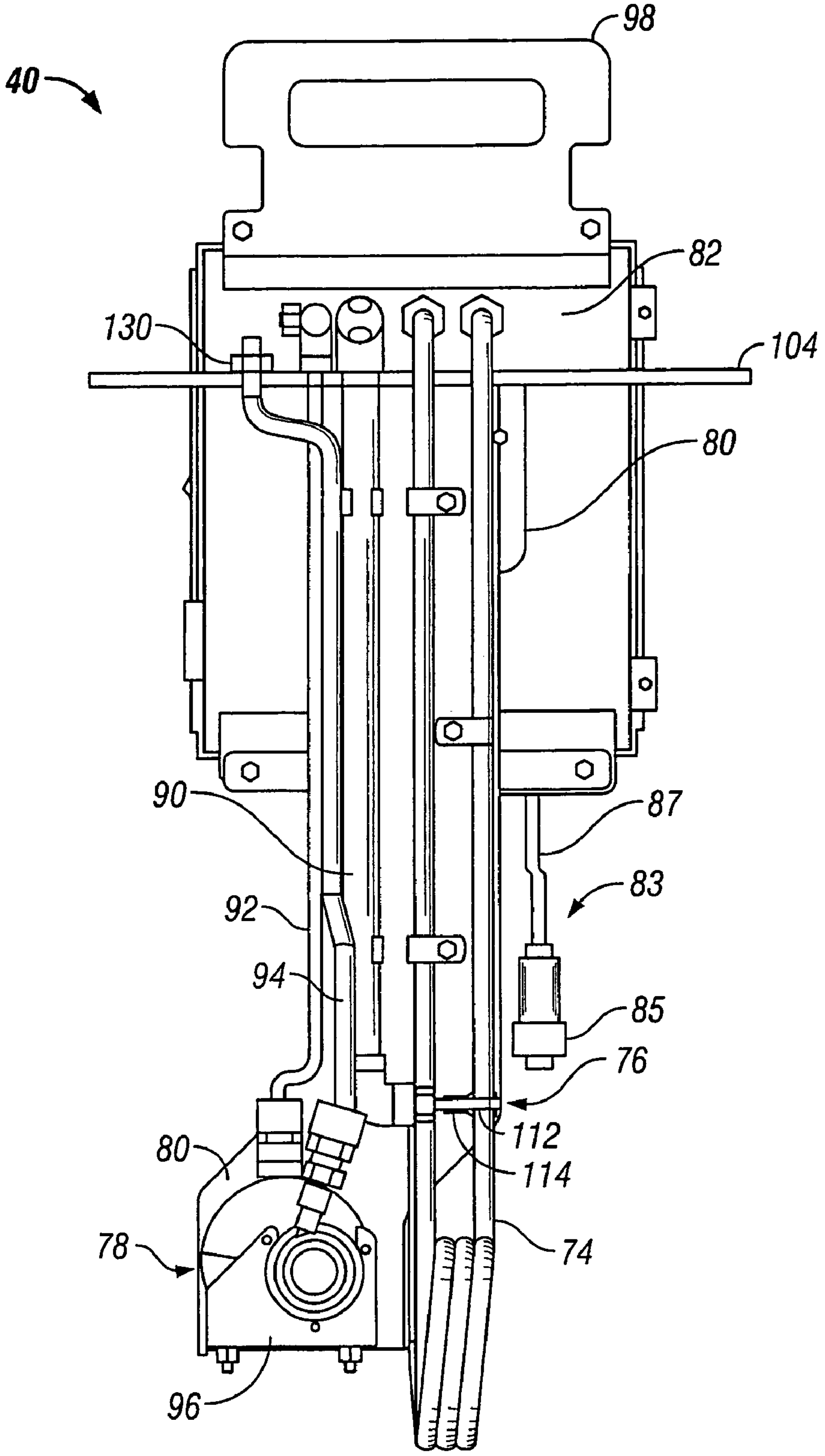
FIG. 3 is a front elevation view of an improved module of the parts washer in FIG. 1 useful for temperature and pump control.

FIG. 3 is a front elevation view of an improved module 40 of the parts washer 10 in FIG. 1 useful for temperature and pump control. It will be noted that a rigid bracket 80 extends and depends from the enclosure 82 in order to provide a rigid support for the heating element 74, sensor assembly conduit 90, pump assembly conduit 92, and pump outlet tube 94. The bracket 80 extends outward away from a back surface of the enclosure 82 at a predetermined distance sufficient to allow the enclosure 82 to remain disposed on an exterior of the reservoir when an upper portion of the bracket 80 engages the upper seam 89 of the reservoir 42. The bracket 80 then extends downwardly to a point adjacent the lowest extent of the pump assembly 78. It will be noted that the heating element 74, sensor assembly conduit 90, pump assembly conduit 92 and pump outlet 94 do not bear any of the load of their associated components. As a result, component life is extended and overall performance of the parts washer is significantly increased. An additional support 96 is connected to the pump assembly 78 and the bracket 80 in order to provide additional support and stabilization for the pump assembly 78.

The enclosure 82 also includes a handle 98 connected adjacent an upper wall of the enclosure 82 in order to provide an operator a convenient structure to grasp and manipulate the module during installation or removal. As a result, the module 40 is handled with more care and the components associated therewith are not damaged. Pigtail 83 is connected to and extends from the enclosure 82. A plug 85 is disposed at a distal end of a cord 87 for connection with a complimentary plug of the lamp assembly.

Figure 4:
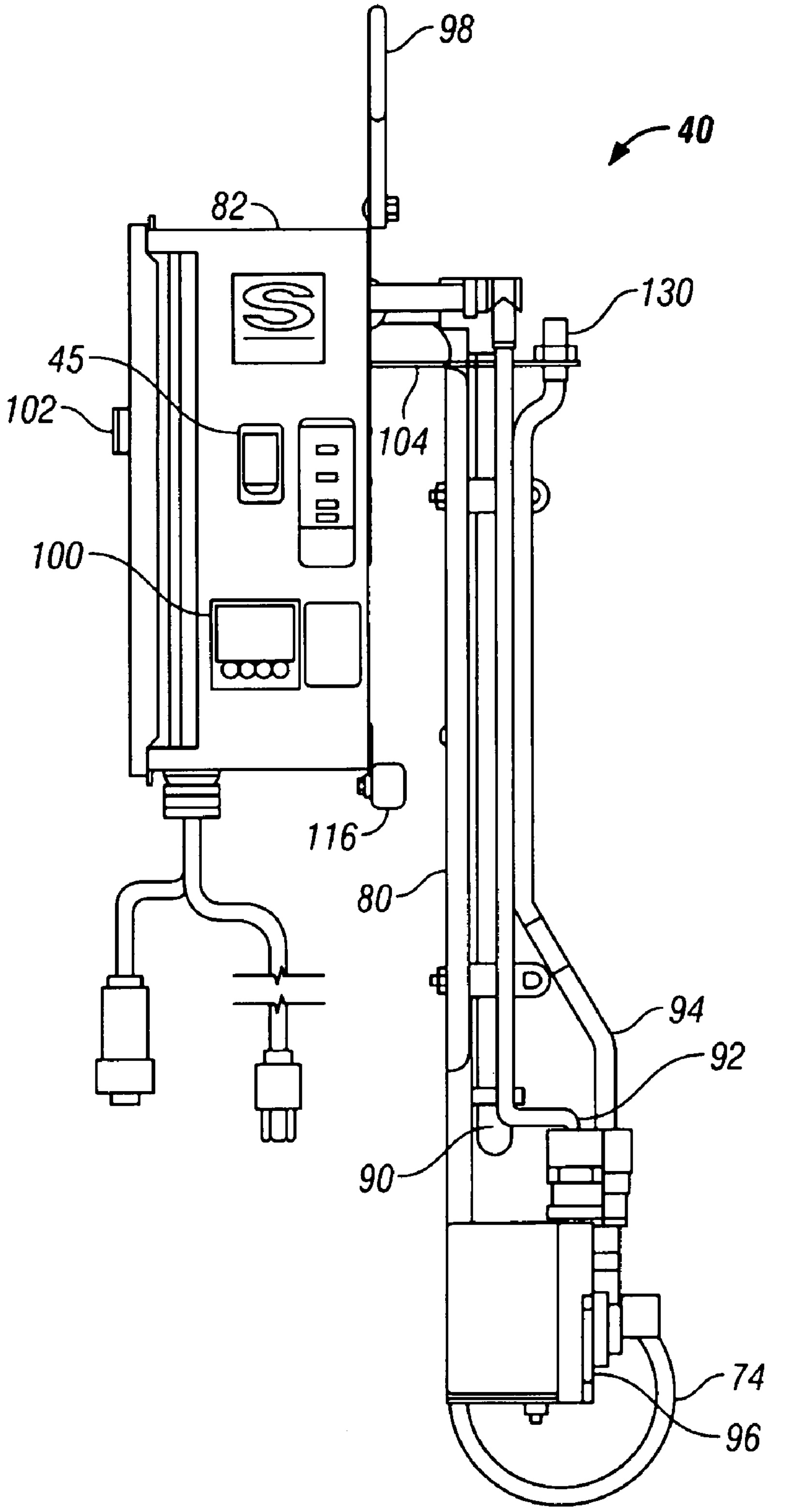
FIG. 4 is a side elevation view of the module of FIG. 3.
Figure 6A:
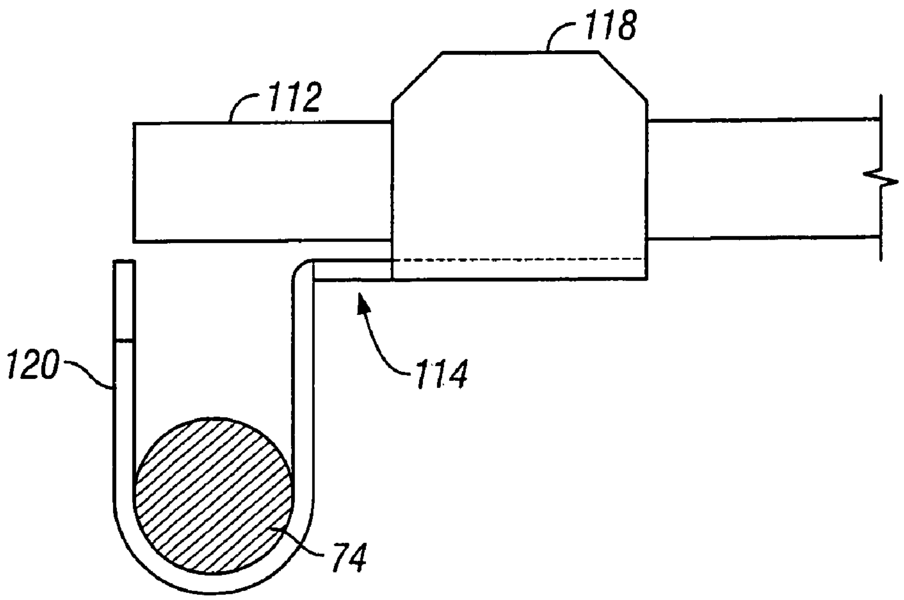
FIGS. 6A and 6B are detailed side views of the sensor assembly of FIGS. 5A1 and 5B1, respectively.
Figure 6B:
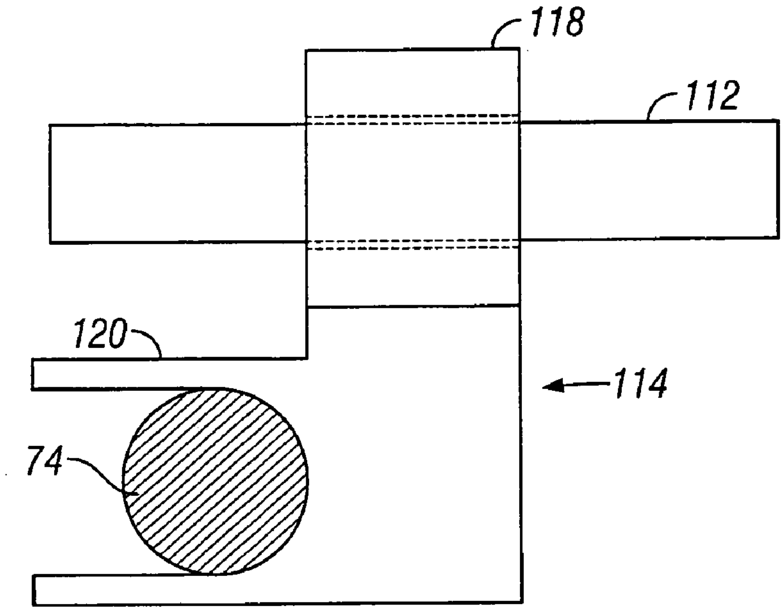

FIG. 4 is a side elevating view of the module of FIG. 3. The enclosure 82 houses a programmable temperature controller 100 for receiving sensor assembly signals and generating heater element signals. The sensor assembly (76, see FIG. 3) is operatively coupled with the temperature controller 100 such that the temperature controller 100 may display the temperature of the cleaning liquid and a low liquid level condition. The temperature controller 100 is a modular unit which is replaceable from an exterior of the enclosure 82. A suitable temperature controller is similar to the product manufactured and offered by Red Lion Controls as Model No. TLA11100, which has been successfully used herein. It will be noted that other suitable temperature controllers may be used.

Generally, the temperature controller 100 includes an alphanumeric array for displaying values representative of the temperature of the cleaning liquid, a temperature set point and error codes. The temperature controller 100 further includes a main control for maintaining the cleaning liquid temperature at a temperature set point by receiving the sensor assembly signal, comparing the sensor assembly signal against the set point, generating an activation signal if the sensor assembly signal is less than the set point and generating a deactivation signal if the sensor assembly signal is greater than the set point. The main control is operatively coupled to an interface control for generating a heating element signal responsive to the activation and deactivation signal for activating and deactivating the heating element 74. Preferably, the interface control is configured as a solid state relay that may be energized or de-energized in response to the activation or deactivation signal. It will be noted that other suitable devices, either in the form of hardware or software, may be used in order to perform the intended function.

The temperature controller 100 is operatively coupled to the heating element 74 as discussed above and selectively activates the heating element 74 to substantially maintain the temperature of the cleaning liquid within a pre-selected range. It will be noted that the temperature set point may be a specific temperature value. However, it is more common that the cleaning liquid would have an optimal performance within a predetermined temperature range. In such instance, the set point may in fact be a range of temperature values such that the heating element 74 is activated at a first temperature value, a lower limit, and deactivated at a second temperature value, an upper limit, which is greater than the first temperature value. As the cleaning liquid gradually cools back to the lower limit, the heating element 74 is then again activated. In this manner, the cleaning liquid is maintained within its optimal performance range and wear and tear on the temperature controller 100 and heating element 74 is reduced.

The module 40 further includes a resettable circuit interrupter. In FIG. 4 the reset button 102 is shown on an exterior of a moveable panel of the enclosure 82. The circuit interrupter is disposed within the enclosure for protection of operators when in industrial environments. The power on/off switch 45 may also be disposed on an exterior surface of the enclosure 82 as shown in FIG. 4.

As shown in FIGS. 1, 3 and 4, the module 40 further includes a plate 104 which is connected to the bracket 80 for covering an opening defined between an upper edge of the reservoir 42 and the adjacent parts receiving receptacle. The edge of the plate 104 adjacent the enclosure 82 extends chordwise along the upper seam 89 from a first point to a second point where the parts receiving receptacle 12 intersects the upper seam 89.

Figure 7:
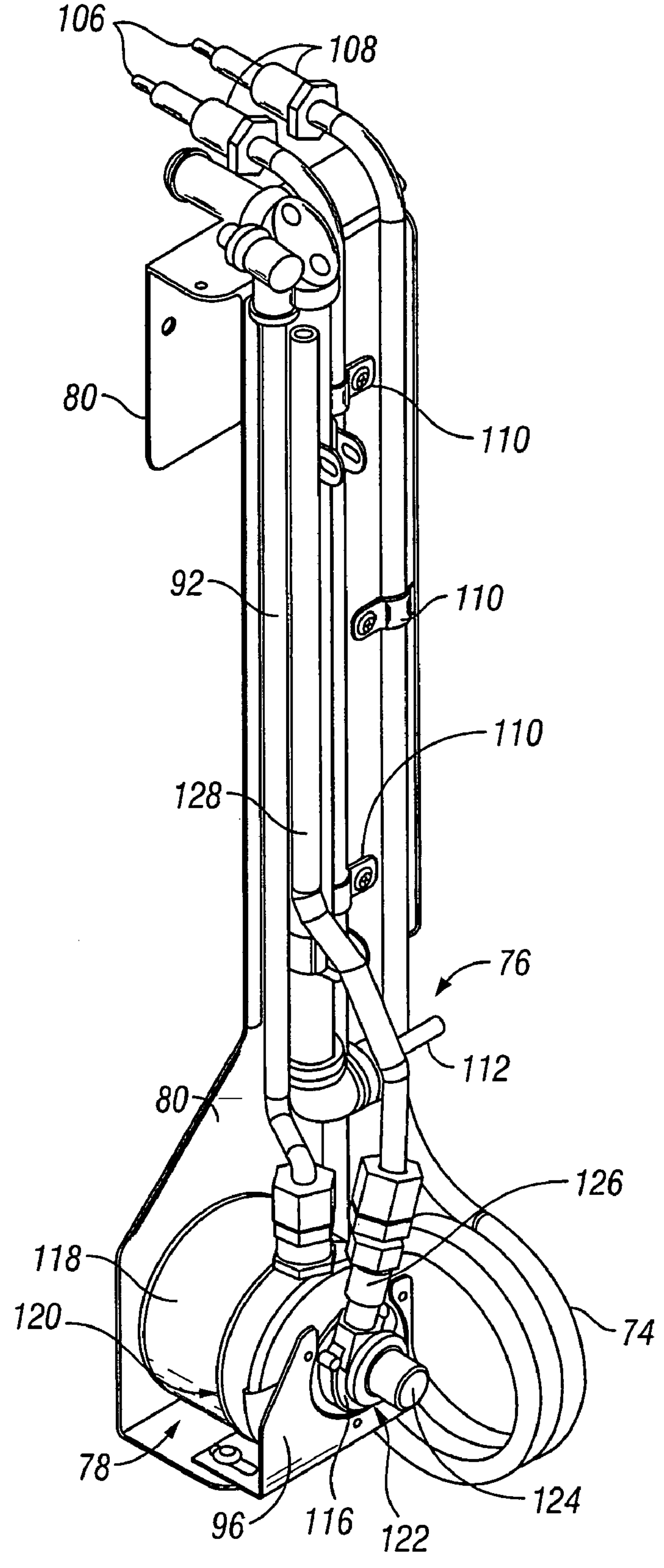
FIG. 7 is a perspective view of the module of FIGS. 3 and 4.

The heating element 74, as best shown in FIGS. 3, 4 and 7, is generally formed as an electrically resistive element having additional coils disposed adjacent the pump assembly 78. The ends 106 of the heating element 74 extend through the enclosure wall for connection to the activation/deactivation circuit disposed therein. The heating element 74 is connected to the enclosure at each end by a hex nut 108. A plurality of clamps 110 are used to secure the heating element to the bracket 80 such that the heating element does not move. As a result, connection of the heating element 74 at the hex nuts 108 does not experience any load which might induce failure or expose the interior of the enclosure to undesirable elements.

The sensor assembly 76, as best shown in FIGS. 3 and 7, includes a thermocouple (not shown) disposed within a thermowell 112, a bridge 114 and a sensor assembly conduit 90. The thermocouple is disposed within the thermowell to protect the thermocouple from the harsh environment of the cleaning liquid. However, unlike the prior art, a breach of the thermowell 112 will not result in failure of the thermocouple. Wires for the thermocouple are routed through the sensor assembly conduit 90. The thermocouple generates the sensor assembly signals which are received by the temperature controller. The sensor assembly signals are useful for the temperature of the cleaning liquid and a low liquid level condition.

In operation, when the thermowell 112 and bridge 114 are immersed in the cleaning liquid, the thermocouple will read the temperature of the cleaning liquid. Accordingly, the temperature controller will display the temperature of the cleaning liquid. However, if the level of the cleaning liquid falls below the thermowell 112 and bridge 114, the temperature sensed by the thermocouple will rapidly rise above the temperature set point. The bridge 114 thermally links the heating element 74 to the thermowell 112. As a result, when the cooling liquid no longer immerses the thermowell 112 and bridge 114, the thermocouple reads the temperature of the heating element 74. The operator will note this condition on the display of the temperature controller. The operator may then reset the temperature controller in an attempt to continue further cleaning operations. If the temperature controller display immediately indicates another over temperature condition, the operator will know that the cleaning liquid level is in a low liquid level condition and more cleaning liquid needs to be added.

FIGS. 5A1, 5A2, 6A and 5B1, 5B2 and 6B illustrate a detailed view of embodiments of the sensor assembly of the module of FIGS. 3, 4 and 7. In one embodiment, the bridge 114 is contiguous with the thermowell and the heating element. Generally, the bridge 114 engages at a first end to the thermowell 112 and at a second the heating element 74 such that the bridge thermally conducts heat directly from the heating element 74 to the thermowell 112 and the thermocouple disposed therein when the cleaning liquid is in a low liquid level condition. The bridge is constructed from a thermally conductive material. Preferably, this thermally conductive material may be metal. However, any suitable thermally conductive material may be used. In one embodiment, the first end of the bridge 114 engages the thermowell 112 without encircling it and the second end of the bridge 114 engages the heating element 74 without encircling it. In another embodiment, the first end of the bridge 114 encircles the thermowell 112 and engages the thermowell 112 with an interference fit and the second end of the bridge 114 is contiguous with the heating element 74. In yet another embodiment for detecting a low liquid level condition, the thermowell is disposed closely proximate to the heating element such that when the cleaning liquid is in the low liquid level condition the thermocouple detects a temperature of the heating element rather than a temperature of the cleaning liquid.

Referring again to the FIGS. 3, 4 and 7, the pump assembly 78 includes a pump 116 and a motor 118 for driving the pump 116. The pump assembly 78 further includes a housing 120, an inlet 122 having a screen filter 124 and an outlet fitting 126 to which the pump assembly outlet tube 128 is connected. The pump assembly outlet tube 128 has an end fitting 130 connected to an end distal end thereof. The end fitting 130 extends through and is operatively connected to the plate 104 connected to the bracket 80 for covering the opening defined between an upper edge of the reservoir and the parts receiving receptacle. The pump assembly housing 120 is preferably constructed from metal. However, any other suitable material of construction may be used.

The support 96 is connected to the pump housing 120 by a plurality of fasteners and to the bracket 80 by additional fasteners such that the pump assembly 78 and support 96 are integrally, modularly, interchangeable independent of the remainder of the module. This is particularly advantageous, because in the field, the most common failure is the pump. More precisely, the outlet fitting 126 most often fails resulting in no cleaning liquid circulation into the parts receiving receptacle. A parts washer constructed in accordance with the principles of the present invention may have the pump assembly 78 changed in the field in under two minutes by unfastening the fasteners between the support 96 and the bracket 80 and the quick disconnect connections between the outlet tube 128 and the pump assembly conduit 92. As a result, operators of the parts washers are able to continue their operations with little delay and lower costs.

Figure 9:
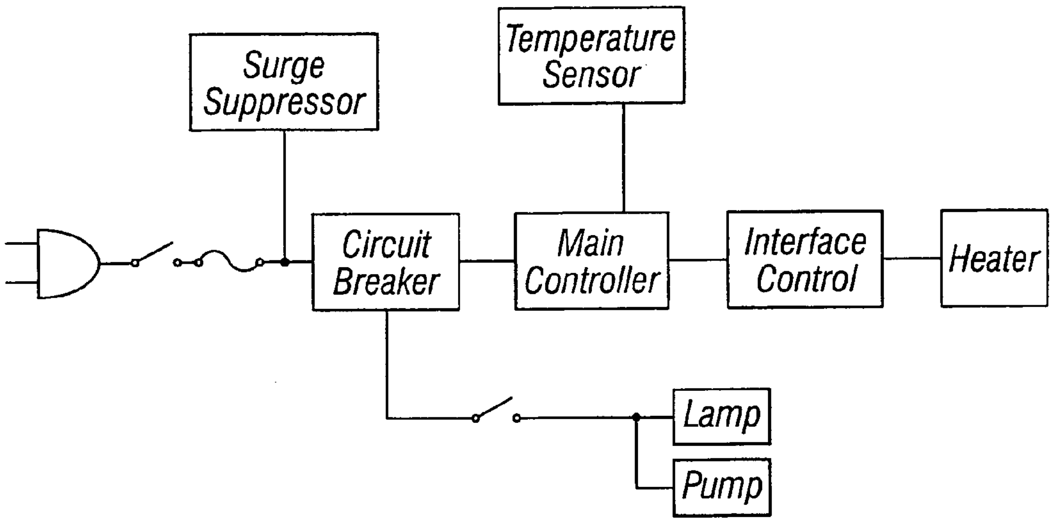
FIG. 9 is a flow chart illustrating the operation of the temperature and pump module.

The temperature controller, as discussed above with respect to FIGS. 3, 4 and 7 and as shown in FIG. 9, includes a processing unit and memory that stores programming instructions, that when read by the processing unit cause the controller to function to: (i) receive a set point for a desired cleaning liquid temperature; (ii) activate the heating element periodically; (iii) monitor the temperature of the cleaning liquid continuously; (iv) compare the monitored temperature of the cleaning liquid against the set point; (v) alter the periodic activation of the heating element such that the temperature of the cleaning liquid is moved toward the set point; and (vi) repeat steps (ii)–(v) for a desired period of time. An operator inputs the set point to the temperature controller. Alternatively, in another embodiment, the manufacturer of the temperature controller or parts washer may pre-program a set point for a certain cleaning liquid which is not adjustable by an end user.

As discussed above, the heating element is periodically activated by the temperature controller main control and interface control. The step of activating the heating element periodically includes the step of deactivating the heating element when the temperature of the cleaning liquid exceeds the set point, which may also be an upper limit of a temperature range as discussed above. The sensor assembly is operatively coupled to the temperature controller such that the temperature controller may monitor the temperature of the cleaning liquid continuously. The main control of the temperature controller compares the monitored temperature of the cleaning liquid against the set point and cooperatively with the interface control, periodically activates the heating element in order to maintain the temperature of the cleaning liquid at or within the temperature set point or range. The steps for this process are continuously repeated as long as the switch is in the on position.

The temperature controller may also include further programming instructions, that, when read by the processing unit, causes the controller to function to: (i) generate an error code in response to an over-temperature condition; and (ii) deactivate the heating element in order to correct the over-temperature condition. The temperature controller generates an error code which is output to the alpha numeric display when an over-temperature condition is identified. Generally, an over-temperature condition is not identified by the temperature controller when the cleaning liquid is approximately six (6) degrees Fahrenheit above the temperature set point or upper limit of the range. Rather, an over-temperature condition is identified by the temperature controller when the temperature of the cleaning liquid exceeds the temperature set point or upper limit of the range by at least seven, (7) degrees Fahrenheit. It will be noted that ordinary operation of the parts washer without disruptive error codes is beneficial to the operator. However, a dangerous or potentially damaging over-temperature condition must be identified and brought to the attention of the operator. As discussed above, the set point may be defined as an operating range having an upper limit and a lower limit to which the temperature of the cleaning liquid is compared. Moreover, the over-temperature set off value discussed above may be adjusted to correspond with the operator's or cleaning liquid requirements.

The enclosure 82 further includes a handle 98 for lifting the module 40 which is disposed adjacent a top edge of the enclosure 82. A spacer 116 for aligning the enclosure 82 with respect to the reservoir 42 is disposed adjacent at bottom edge of the enclosure 82.

Referring now to FIGS. 5A1, 5A2 and 6A, one embodiment of the bridge 114 is illustrated. In this embodiment, a copper element engages the thermowell 112 at a first end 118 without encircling the thermowell 112. The second end 120 of the bridge 114 engages the heating element 74 without encircling. It will be noted that the first and second ends 118,120 of the bridge 114 are sufficiently contiguous with the thermowell and heating element, respectively, such that the bridge 114 thermally links the heating element and the thermowell. It will be noted that the material of construction for the bridge may be any suitable thermally conductive material that will accomplished the intended function, as discussed below.

Referring to FIGS. 5B1, 5B2 and 6B, another embodiment of the bridge 114 is illustrated. In this embodiment, the first end 118 of the bridge 114 encircles the thermowell 112 and engages the thermowell 112 with an interference fit. It will be noted that the term interference fit shall include not only the accepted engineering definition thereof, but also a fit which is generally more loose than the strict definition of interference fit. In this embodiment, the second end 120 of the bridge 114 is contiguous with the heating element 74. Again, the bridge 114 is constructed of a material which is thermally conductive. Any such thermally conductive material including, but not limited to, copper, aluminum, nickel or other thermally conductive plastics or materials may be suitable.

A parts washer constructed in accordance with the teachings of the present invention further includes a main power switch 45, a circuit interrupter, a circuit interrupter reset button 102, a surge suppressor and a fuse. Many of these are shown schematically in FIG. 9. Each of these components is designed to enhance the durability and longevity of the parts washer.

A specified method of operating a parts washer for washing mechanical parts including a parts receiving receptacle positionable on a reservoir for cleaning liquid, a drain opening formed in a part of the receptacle and a module for adjusting a temperature and circulation of the cleaning liquid includes the following steps: qualifying an electrical service outlet to confirm proper wiring thereof; connecting the module to the qualified electrical service outlet; activating a main power switch on the module; inputting a desired temperature set point to a temperature controller associated with the module; actuating a switch to activate a pump connected to the module for circulating the cleaning liquid from the reservoir into the receptacle; and cleaning parts.

Figure 8:
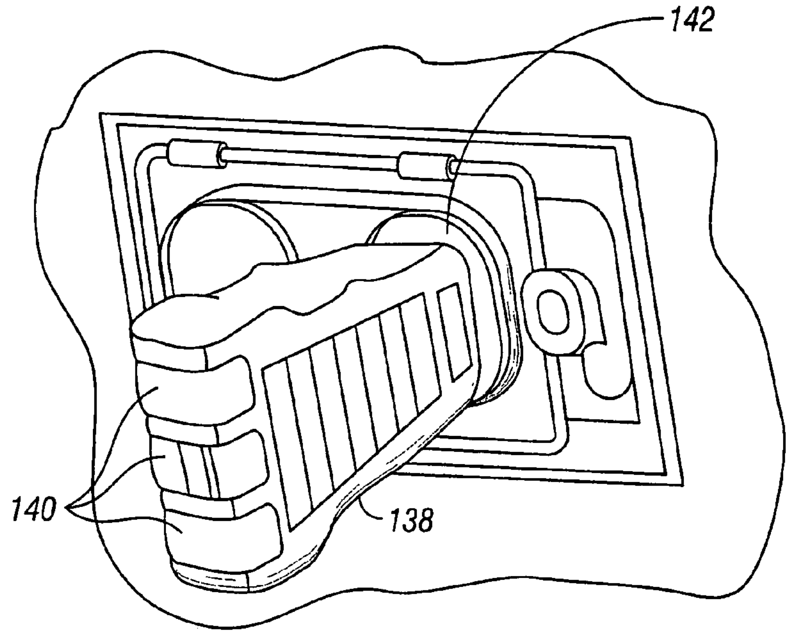
FIG. 8 is perspective view of a circuit tester being used to pre-qualify an electrical service receptacle.

A critical step in ensuring longevity and minimal damage to parts washer is the step of qualifying an electrical service outlet. As shown in FIG. 8, a circuit tester 138 may be used to determine proper wiring of an electrical service outlet 142. Improper wiring can cause damage over the long term to the parts washer. The circuit tester illustrated in FIG. 8 includes a plurality of lights on 140 an end opposing the prongs which are inserted into the electrical service outlet 142. These lights indicated to the operator the condition of the wiring within the electrical service outlet. For instance, a series of lights may be illuminated to indicate that the electrical service outlet 142 is properly wired. Another series of lights may indicate that the neutral circuit for the electrical service outlet 142 is incorrect. Yet another series of lights may indicate that the ground circuit for the electrical service outlet is incorrect. It will be noted that other series of lights may be used to indicate other conditions of the electrical service outlet 142.

In further operation, an operator observes an over-temperature error code generated and displayed by the temperature controller. The operator resets the temperature controller such as the temperature controller may run at a desired set point. The operator then observes whether the over-temperature error code is repeated. If the over-temperature error code is repeated the operator adds cleaning liquid.

As shown in the disclosed embodiment, the parts washer having an improved heating and pump module of the present invention can provide a durable field repairable parts washer with accurate, adjustable temperature control and over-temperature safety.

The invention is not limited to the particular details of apparatus depicted and other modifications and applications may be contemplated. For example, the pump may be a positive displacement type which is or is not immersible. Moreover, a pedestal pump with an extended shaft connecting the motor disposed outside the cleaning liquid to a pump volute disposed inside the cleaning liquid may be used. Certain other changes may be made in the above described apparatus without departing from the true spirit and scope of the invention herein involved. It is intended, therefore that the subject matter of the above depiction shall be interpreted as illustrated and not in any limiting sense.

What is claimed is:

1. A sensor assembly for detecting a temperature and low liquid level condition of a cleaning liquid in combination with a parts washer, comprising:

the parts washer including a reservoir for the cleaning fluid, a receptacle disposed above the reservoir, a drain opening defined in a part of the receptacle for fluid communication between the receptacle and the reservoir and a module;

a heating element extending from the module and substantially immersed in the cleaning fluid;

a thermowell immersed in the cleaning liquid;

a thermocouple disposed with the thermowell and operatively coupled to a temperature controller of the module; and a bridge connected at a first-end to the thermowell and at a second end to the heating element such that the thermocouple detects the temperature of the cleaning fluid in an operating condition and the bridge conducts heat directly from the heating element to the thermowell and the thermocouple disposed therein when the cleaning liquid is in a low liquid level condition.

2. The sensor assembly and parts washer combination as defined in claim 1, wherein the bridge is constructed from a thermally conductive material.

3. The sensor assembly and parts washer combination as defined in claim 1, wherein the first end of the bridge engages the thermowell without encircling and the second end of the bridge engages the heating element without encircling.

4. The sensor assembly and parts washer combination as defined in claim 1, wherein the first end of the bridge encircles the thermowell and engages the thermowell with an interference fit and the second end of the bridge is contiguous with the heating element.

5. A sensor assembly for detecting a temperature and low liquid level condition of a cleaning liquid in combination with a parts washer, comprising:

the parts washer including a reservoir for the cleaning fluid, a receptacle disposed above the reservoir, a drain opening defined in a part of the receptacle for fluid communication between the receptacle and the reservoir and a module;

a heating element extending from the module and substantially immersed in the cleaning fluid;

a thermowell immersed in the cleaning liquid;

a thermocouple disposed with the thermowell and operatively coupled to a temperature controller of the module; and the thermowell disposed closely proximate the heating element such that the thermocouple detects the temperature of the cleaning fluid in an operating condition and when the cleaning liquid is in a low-liquid level condition the thermocouple detects the temperature of the heating element rather than the temperature of the cleaning liquid.

* * * * *